United States Patent
Deavila

(10) Patent No.: US 8,056,910 B2
(45) Date of Patent: Nov. 15, 2011

(54) MOBILE SAFETY COMPLIANCE APPARATUS

(76) Inventor: Pericles Deavila, North Salt Lake, UT (US)

( * ) Notice: Subject to any disclaimer, the term of this patent is extended or adjusted under 35 U.S.C. 154(b) by 171 days.

(21) Appl. No.: 11/683,382

(22) Filed: Mar. 7, 2007

(65) Prior Publication Data

US 2007/0278757 A1    Dec. 6, 2007

Related U.S. Application Data

(63) Continuation of application No. 09/876,550, filed on Jun. 7, 2001, now Pat. No. 7,188,846.

(60) Provisional application No. 60/210,267, filed on Jun. 8, 2000, provisional application No. 60/268,597, filed on Feb. 13, 2001.

(51) Int. Cl.
*B62B 3/00* (2006.01)

(52) U.S. Cl. ..................... 280/47.35; 280/30

(58) Field of Classification Search .............. 280/30, 280/47.34, 47.35, 47.19, 47.24, 47.26, 79.2; 4/516, 518, 620, 627; 312/209
See application file for complete search history.

(56) References Cited

U.S. PATENT DOCUMENTS

| | | | |
|---|---|---|---|
| 2,883,731 A | 4/1959 | Wells | |
| 3,254,756 A | 6/1966 | Rankin | |
| 3,558,180 A * | 1/1971 | Algire | 296/174 |
| 3,876,223 A | 4/1975 | O'Reilly et al. | |
| 4,625,949 A * | 12/1986 | Walker | 266/48 |
| 4,632,412 A | 12/1986 | Nasgowitz | |
| 4,674,231 A * | 6/1987 | Radek et al. | 49/118 |
| 4,790,610 A | 12/1988 | Welch et al. | |
| 4,854,305 A * | 8/1989 | Bremer | 602/32 |
| 4,953,879 A | 9/1990 | Cain | |
| 4,998,302 A * | 3/1991 | Silva | 4/516 |
| 5,255,303 A * | 10/1993 | DiMaio et al. | 378/177 |
| 5,263,213 A * | 11/1993 | Robertson et al. | 5/627 |
| 5,274,864 A * | 1/1994 | Morgan | 5/627 |
| 5,343,574 A | 9/1994 | Butte | |
| 5,393,118 A * | 2/1995 | Welborn | 296/147 |
| 5,439,194 A | 8/1995 | Lankford | |

(Continued)

FOREIGN PATENT DOCUMENTS

DE    9214211    12/1992

(Continued)

OTHER PUBLICATIONS

International Search Report from PCT/US2008/079220 dated Jul. 27, 2009.

(Continued)

*Primary Examiner* — Frank B Vanaman
(74) *Attorney, Agent, or Firm* — Workman Nydegger

(57) ABSTRACT

A mobile safety compliance apparatus comprising a shell with a plurality of open compartments closed by doors, a self-contained water supply system and a waste water collection system. The water supply system provides drinking water, tepid hand washing water, and water for a stowable eyewash hingedly attached to the shell. The waste water collection system collects water from the eyewash and a sink mounted in a recessed area of the shell. Doors are removable and have features to facilitate alternative uses such as a stretcher or a freestanding table. A stowable seat and table are hingedly attached to the shell. The apparatus includes an electrical system with battery backup for powering lights, water heating and refrigeration devices, and electronic communication equipment that may be mounted on the shell. The apparatus includes wheels to facilitate its movement and anchor points to secure it to the ground.

35 Claims, 12 Drawing Sheets

U.S. PATENT DOCUMENTS

| | | | |
|---|---|---|---|
| 5,443,168 A | | 8/1995 | Dyment |
| 5,518,258 A | * | 5/1996 | Cox ............................... 280/30 |
| 5,595,395 A | | 1/1997 | Wilson |
| 5,605,344 A | * | 2/1997 | Insalaco et al. ............ 280/47.34 |
| 5,664,853 A | | 9/1997 | Nickolaus, Jr. |
| 5,671,933 A | | 9/1997 | Tucker |
| 5,702,115 A | * | 12/1997 | Pool ........................... 280/47.35 |
| 5,709,157 A | * | 1/1998 | Hanusiak ....................... 108/78 |
| 5,820,143 A | * | 10/1998 | Rigo ........................... 280/47.19 |
| 5,833,330 A | * | 11/1998 | Kos ............................... 312/209 |
| 5,848,798 A | | 12/1998 | Halvorson, Jr. et al. |
| 5,857,526 A | | 1/1999 | Manges |
| 5,893,572 A | | 4/1999 | Parks |
| 5,918,323 A | | 7/1999 | Smith |
| 5,928,505 A | | 7/1999 | Inakagata et al. |
| 5,975,660 A | * | 11/1999 | Tisbo et al. .................. 312/263 |
| 5,997,928 A | | 12/1999 | Kaish et al. |
| 6,003,725 A | * | 12/1999 | Blankenau et al. .......... 221/195 |
| 6,047,866 A | | 4/2000 | Brown |
| 6,131,929 A | * | 10/2000 | Haley ......................... 280/47.34 |
| 6,135,539 A | * | 10/2000 | Bailey et al. ................. 296/169 |
| 6,220,610 B1 | * | 4/2001 | Cox ........................... 280/47.19 |
| 6,296,626 B1 | * | 10/2001 | Stein ............................. 604/294 |
| 6,752,146 B1 | | 6/2004 | Altshuler et al. |
| 6,926,343 B2 | * | 8/2005 | Bontrager et al. ............ 296/174 |
| 6,976,279 B1 | | 12/2005 | Berke et al. |
| 7,327,252 B2 | | 2/2008 | Goehler |
| 7,574,207 B1 | | 8/2009 | O'Neil et al. |
| 2004/0021569 A1 | | 2/2004 | Lepkofker et al. |
| 2005/0099299 A1 | | 5/2005 | Tyroler et al. |
| 2005/0209947 A1 | | 9/2005 | Shafer |
| 2006/0111123 A1 | | 5/2006 | Nerat |
| 2007/0106518 A1 | | 5/2007 | Wildman et al. |
| 2007/0120671 A1 | | 5/2007 | Carmichael et al. |
| 2007/0194922 A1 | | 8/2007 | Nathan et al. |
| 2007/0270164 A1 | | 11/2007 | Maier et al. |

FOREIGN PATENT DOCUMENTS

| | | |
|---|---|---|
| KR | 10-2006-0069639 | 6/2006 |
| KR | 10-2006-0119401 | 11/2006 |

OTHER PUBLICATIONS

Written Opinion from PCT/US2008/079220 dated Jul. 27, 2009.
International Preliminary Report on Patentability from PCT/US2008/079220 dated Apr. 13, 2010.
Office Action dated Oct. 13, 2009 from U.S. Appl. No. 11/868,908.
U.S. Appl. No. 09/876,550, Mail Date May 23, 2003, Office Action.
U.S. Appl. No. 09/876,550, Mail Date Jul. 21, 2004, Office Action.
U.S. Appl. No. 09/876,550, Mail Date Mar. 21, 2005, Office Action.
U.S. Appl. No. 09/876,550, Mail Date Nov. 28, 2005, Office Action.
U.S. Appl. No. 09/876,550, Mail Date Jul. 5, 2006, Office Action.
U.S. Appl. No. 09/876,550, Mail Date Oct. 31, 2006, Notice of Allowance.

* cited by examiner

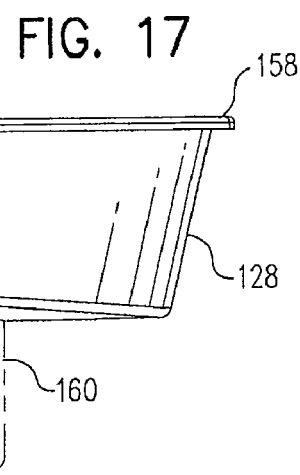
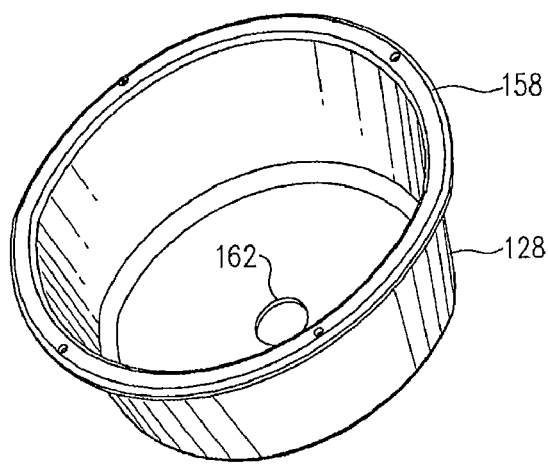
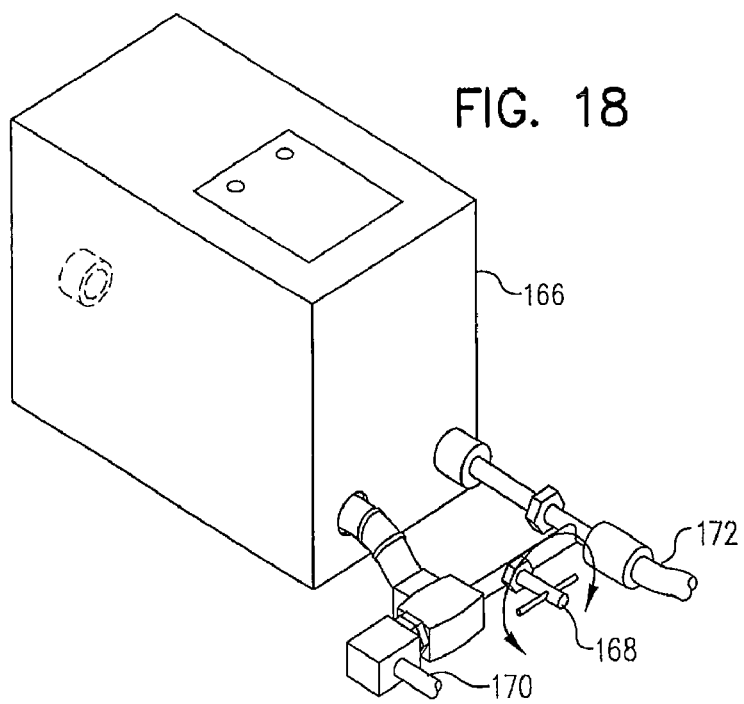

MOBILE SAFETY COMPLIANCE APPARATUS

CROSS REFERENCE TO RELATED APPLICATIONS

This application is a continuation of U.S. Utility patent application Ser. No. 09/876,550, filed on Jun. 7, 2001, now U.S. Pat. No. 7,188,846 entitled MOBILE SAFETY COMPLIANCE APPARATUS; this application also claims the benefit of U.S. Provisional Patent Application No. 60/210,267 filed on Jun. 8, 2000 and U.S. Provisional Patent Application No. 60/268,597, filed on Feb. 13, 2001; all of which are incorporated herein by reference.

BACKGROUND OF INVENTION

1. Field of the Invention

The present invention relates, generally, to safety equipment, and, more particularly to a portable health and safety compliance apparatus having compartments for storage, waste disposal, and a water system for cleaning and washing. The apparatus permits an individual or company to easily comply with health and safety regulations.

2. Background Information

The introduction of OSHA and other health and safety regulations have imposed a substantial cost on industry to provide health equipment and supplies at the job site. Existing ways of providing health and safety devices have a number of disadvantages. Compliance is often achieved by purchasing required health and safety equipment piece by piece and assembling and aggregating it all at the job site, often in an unorganized way. There are often problems of finding suitable storage containers and a method organizing the equipment and supplies. Proper storage for sterile medical supplies may not be available. Medical and safety equipment must be organized so it can be accessed quickly; equipment stored randomly defeats this objective. Furthermore, moving the equipment and supplies from one job site to another can disrupt any effort to organize them and is expensive and inconvenient.

Health equipment and safety equipment are distinct, yet have complementary functions. Health equipment includes hand and eye wash facilities and a well-stocked first-aid kit for treating injuries. Safety equipment usually includes warning lights and bells, sensors, and equipment such as safety glasses and respirators. Also, it is often desired to display printed safety information such as posters, warnings, directives, procedures and the like at a job site where there is often no suitable surface for such display.

Safety compliance is very expensive, and providing an integrated, compact, portable and aesthetically pleasing apparatus can substantially reduce costs of compliance. It is desirable to have a single portable apparatus that houses all the required safety and health equipment for a particular job in an organized fashion and protects it from adverse weather.

There are several portable carts designed for various specific purposes. U.S. Pat. No. 2,905,480 to Giovannelli discloses a carry-all cart with a drinking water supply and multiple compartments closed by doors, but this apparatus is rather small with an opening top and does not appear to have any provisions for making it weather tight.

U.S. Pat. No. 5,333,885 to Pullman discloses a portable part designed for fishermen with various apparatus to hold fishing equipment.

U.S. Pat. No. 5,797,612 to Buccioni discloses a portable cart with internal baskets on roller glides, and is specifically designed to accommodate hockey equipment to.

U.S. Pat. No. 5,224,220 to Cortez discloses a portable recycling and work center which has receptacles for disposing of items and has apparatus for holding cleaning equipment and a first-aid kit and fire extinguisher.

U.S. Pat. No. 4,790,610 to Welch et al. discloses a portable medical emergency crash cart which has a plurality of compartments with a transparent cover to allow visual identification of materials in the compartments. It also has a portion for disposables and a portion for attaching an oxygen tank.

While each of these carts are well-suited for their intended purposes, none of them are particularly well suited for supplying health and safety equipment to a job site. None is designed to be stored outdoors, and none include a sink for washing or any provisions to collect any waste water.

U.S. Pat. Des. 391,343 discloses a portable sink and foot pump integral with apparatus for dispensing soap, paper towels, and a disposal area.

Storage apparatuses designed for outdoor use are not designed to be readily moved and typically do not have wheels.

The present invention provides a mobile safety compliance apparatus which overcomes the limitations and shortcomings of the prior art.

SUMMARY OF INVENTION

The present invention provides a mobile safety compliance apparatus comprising a shell having a base, a top, a plurality of substantially vertical walls between the base and the top, and a plurality of substantially horizontal walls connected to the vertical walls to form a plurality of open compartments. A plurality of doors are hingedly attached to the shell, and the doors are arranged to close the compartments when closed and to provide access to the compartments when open. The apparatus has a water supply system including at least one water supply tank removably stored in one of the compartments, and apparatus connected to the water supply tank to dispense water contained therein. The apparatus also has a waste water collection system including at least one waste water collection tank stored in one of the compartments, and tubing connected to the water collection tank to convey waste water to it. The shell is preferably made of plastic material with the vertical and horizontal walls integrally molded as a single apparatus. The compartments may have removable dividers, and doors may have window portions.

Wheels are provided at the base of the apparatus to facilitate its movement, and flanges are also provided at the base to allow the apparatus to be secured to the ground. The apparatus has a lifting provision at its top which is connected to a rod extending through the apparatus to a support member below the base so that the lifting load is transmitted to the base of the apparatus rather than through the top.

A portion of the outer surface of the apparatus can be used to display printed information and is covered with a removable transparent sheet. A stowable table and a stowable seat are also hingedly attached to the outside of the shell.

Doors may be removable for other uses. In one embodiment a plurality of handles are attached to a door and positioned such that the door can be used as a stretcher to carry a sick or injured person. In another embodiment the door includes a movable portion that is deployed to increase its area, and a plurality of removable support legs are attached to the door when it is removed, thereby supporting the door in a generally horizontal position for use as a freestanding table.

The apparatus has an eyewash attached to the shell. The eyewash receives water from the water supply system, dispenses the water, and collects the water dispensed and directs it to the waste water collection system. The eyewash is pivotable between a stowed position against the shell and a deployed position extending outward from shell. The eyewash is preferably positioned lower than its source of water so that water flows to the eyewash by force of gravity.

The apparatus has a recessed area that includes a sink that collects waste water and directs it to the waste water collection system. A soap dispenser, a cup dispenser, an eyeglass cleaner dispenser, and a tissue dispenser are preferably all attached to the shell in the recessed area. The apparatus preferably has a water heating device for warming water for hand washing. Drinking water is also provided, and optionally may be chilled.

The apparatus includes an electrical system with a power supply and a backup storage battery which powers lights, the water heating and refrigeration systems if they are provided, and electronic communications equipment that may be mounted on the shell.

The apparatus provides the ability to comply with requirements imposed by both health and safety standards for various industrial applications, as well as provides ready access to all the equipment and supplies needed for specific tasks, in a compact mobile unit.

The features, benefits and objects of this invention will become clear to those skilled in the art by reference to the following description, claims and drawings.

BRIEF DESCRIPTION OF DRAWINGS

FIG. 16 is a perspective view of a sink installed in the apparatus.

FIG. 17 is a side view of the sink of FIG. 16.

FIG. 18 is a perspective view of a water heater device installed in the apparatus showing the inlet an outlet water lines and a bypass valve.

DETAILED DESCRIPTION

Figure 1:
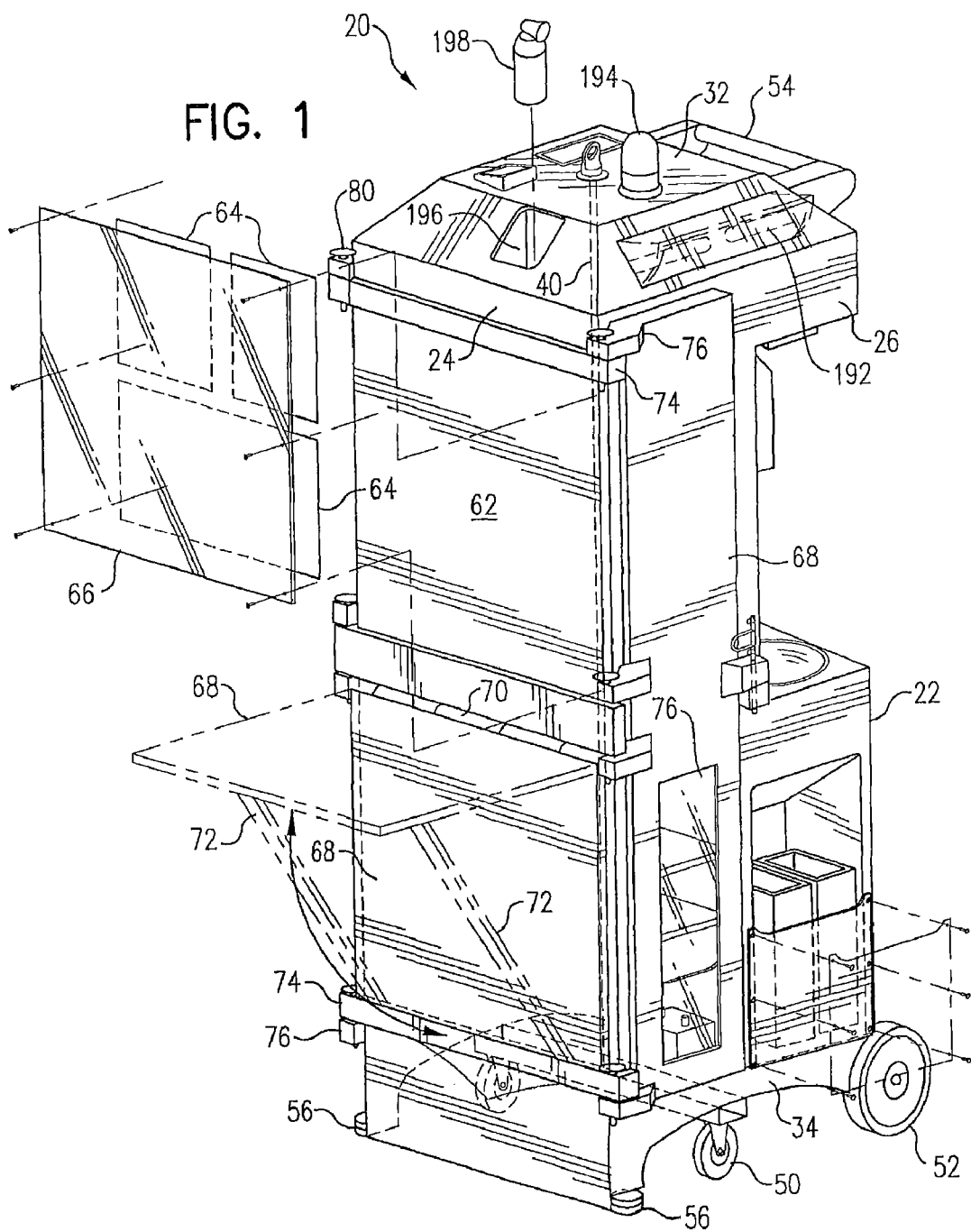
FIG. 1 is a perspective view of a preferred embodiment of a mobile safety compliance apparatus of the present invention.
Figure 2:
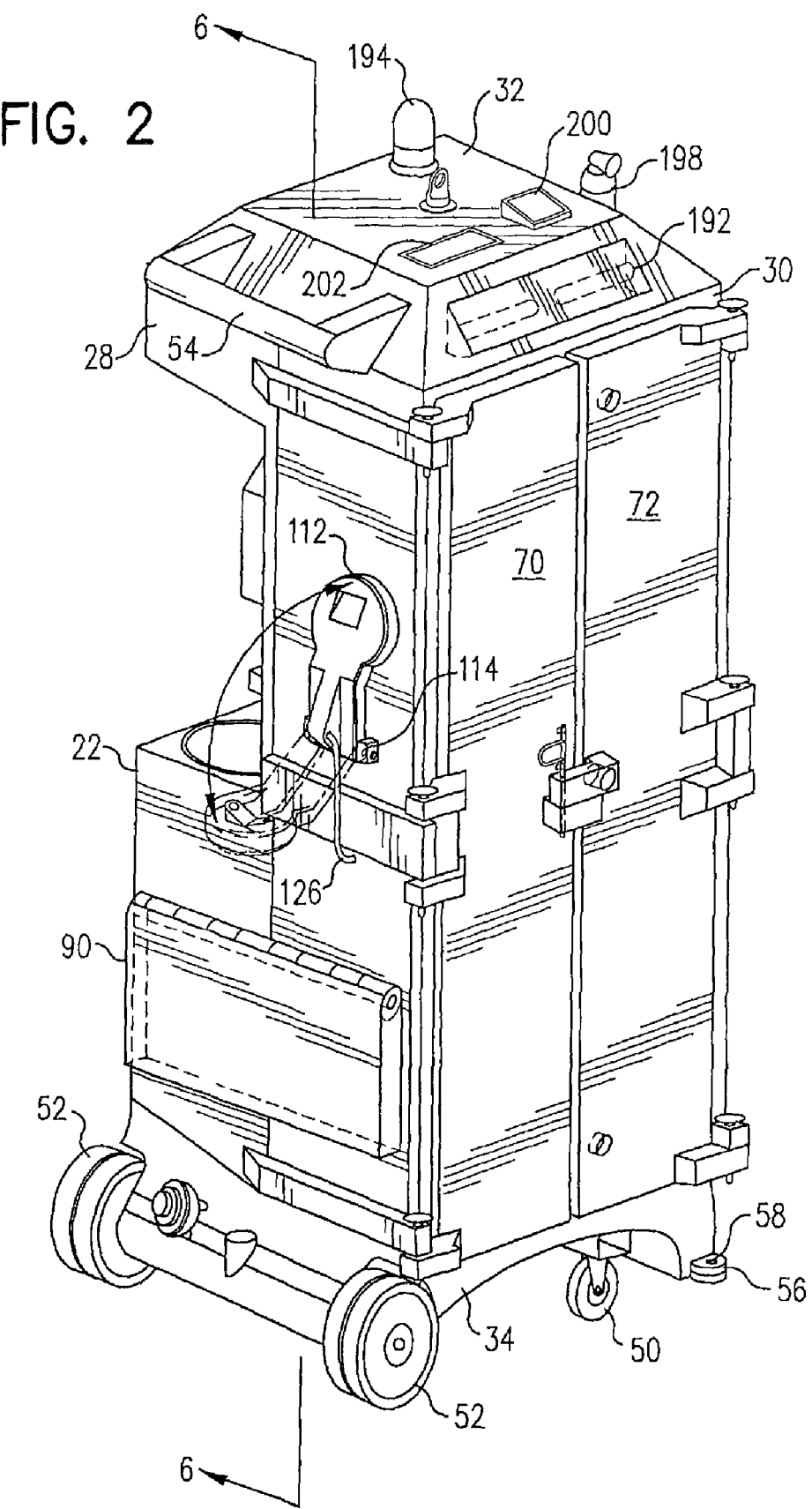
FIG. 2 is a perspective view of the mobile safety compliance apparatus of FIG. 1 from the direction opposite that of FIG. 1.
Figure 3:
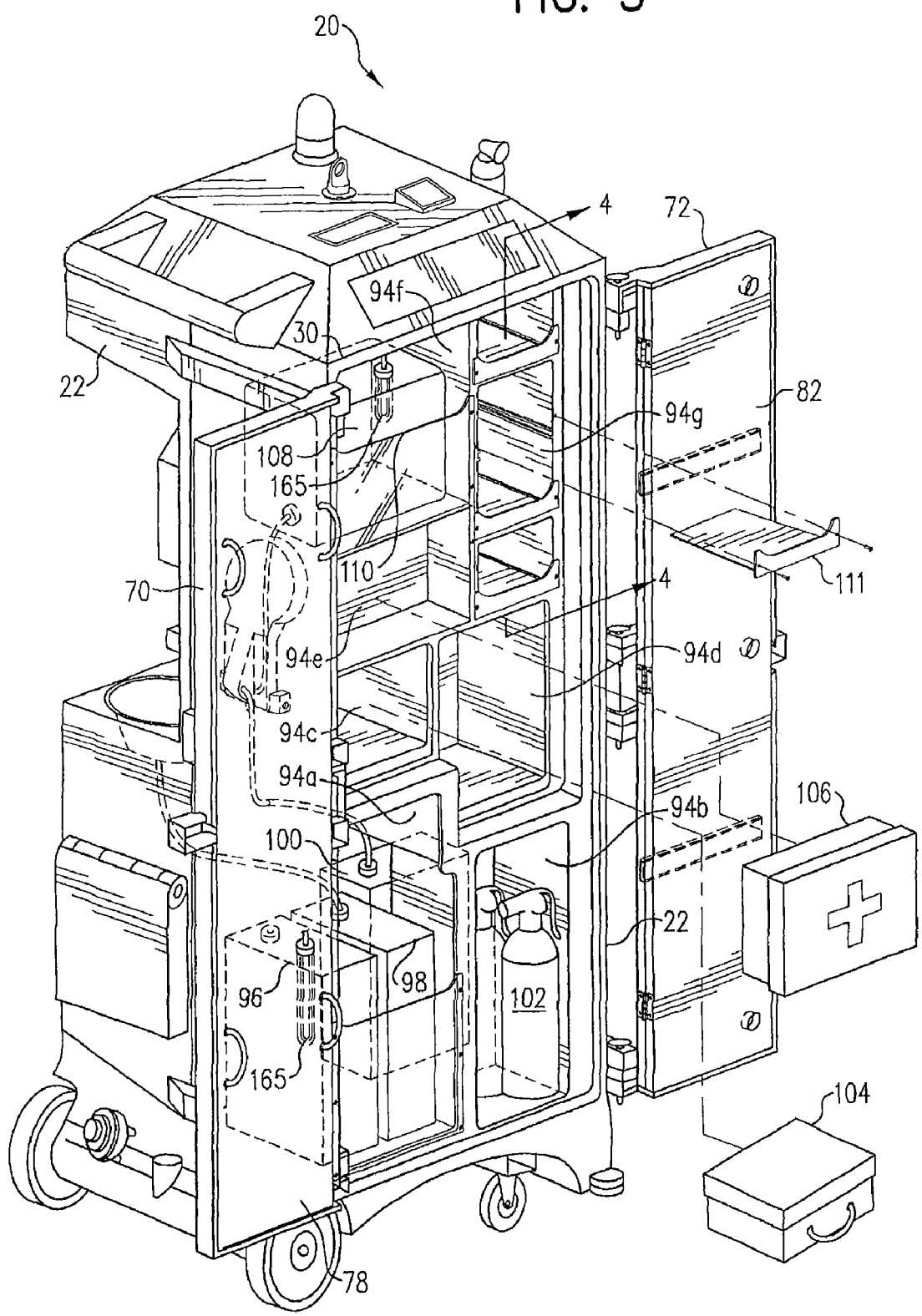
FIG. 3 is the view of FIG. 2 shown with doors open to reveal internal compartments and also illustrating some of the items that can be stored in the compartments.

Referring to FIGS. 1-3, an example of the preferred embodiment of the present invention is illustrated and generally indicated by the reference numeral 20. The present invention is directed to a mobile safety compliance apparatus 20 containing equipment and supplies necessary to comply with health and safety standards in one portable unit. The apparatus has a self-contained water supply system and a waste water collection system. In the preferred embodiment, the apparatus includes an eye wash station, a sink with tepid water for hand washing, potable drinking water and lighting. The apparatus 20 is an elongated cubic structure approximately six feet high by approximately two feet wide and two feet deep with an assortment of compartments and structures that contain and support the many elements installed in the apparatus 20. The equipment and items contained in the apparatus 20 can be selected to meet specific requirements of the user.

Figure 4:
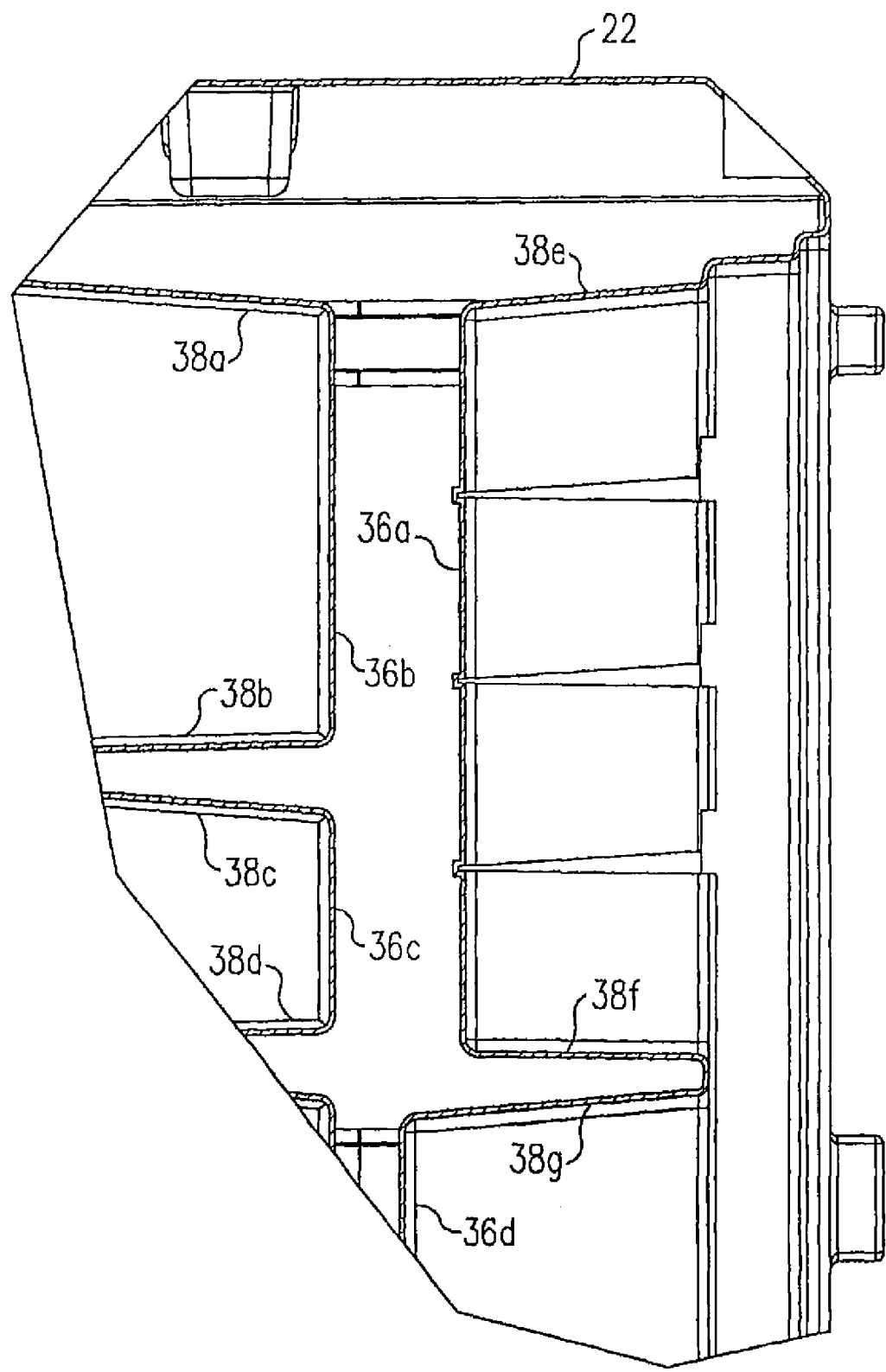
FIG. 4 is a cross sectional view of the portion of the apparatus taken along line 4-4 in FIG. 3.

The core of the apparatus 20 is a shell 22 having four sides 24, 26, 28 and 30, a generally closed top 32, and base 34. Shell 22 is preferably made of plastic and is preferably molded in one piece with wall thicknesses of preferably approximately ¼ inch, preferably using a rotomolding process. Referring also to FIG. 4, shell 22 has a plurality of internal substantially vertical walls 36a-d connected to a plurality of substantially horizontal walls 38a-g. The combination of vertical walls 36 and horizontal walls 38 make a plurality of open compartments 94 used to hold various things as will be described below. Walls 36 and 38 can be configured in any suitable arrangement to create the desired configuration of compartments. The top and base, being generally closed structures, along with integrally molded walls 36 and 38 provide structural strength and stiffness to shell 22.

Figure 5:
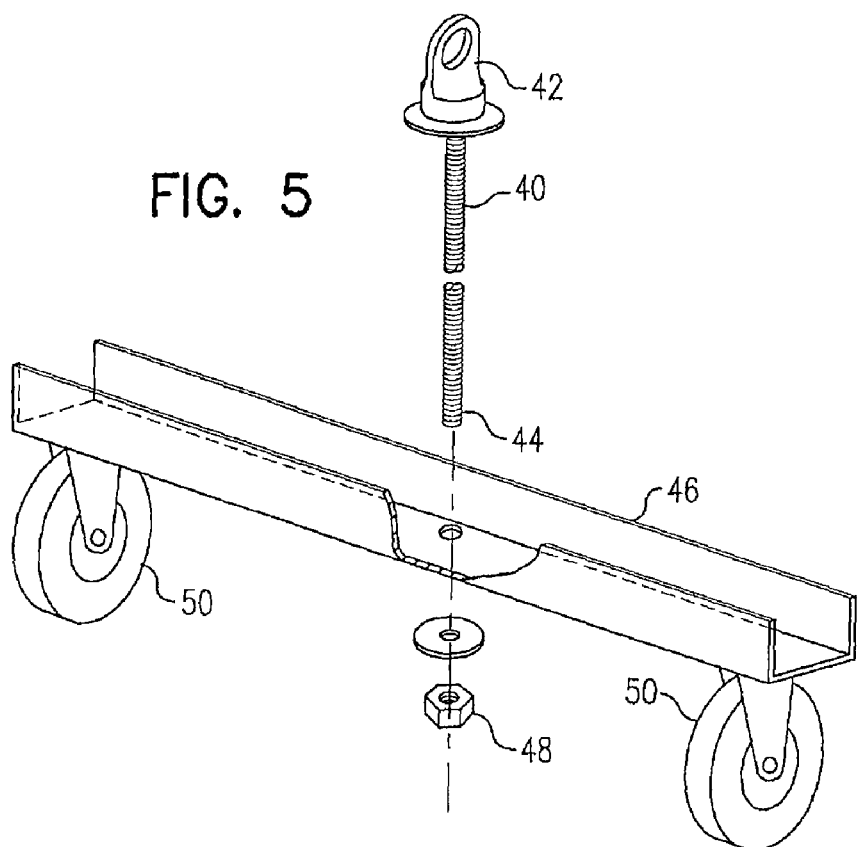
FIG. 5 is a perspective view of a suspension rod and structural channel that attach to the apparatus to facilitate lifting the apparatus from above.
Figure 6:
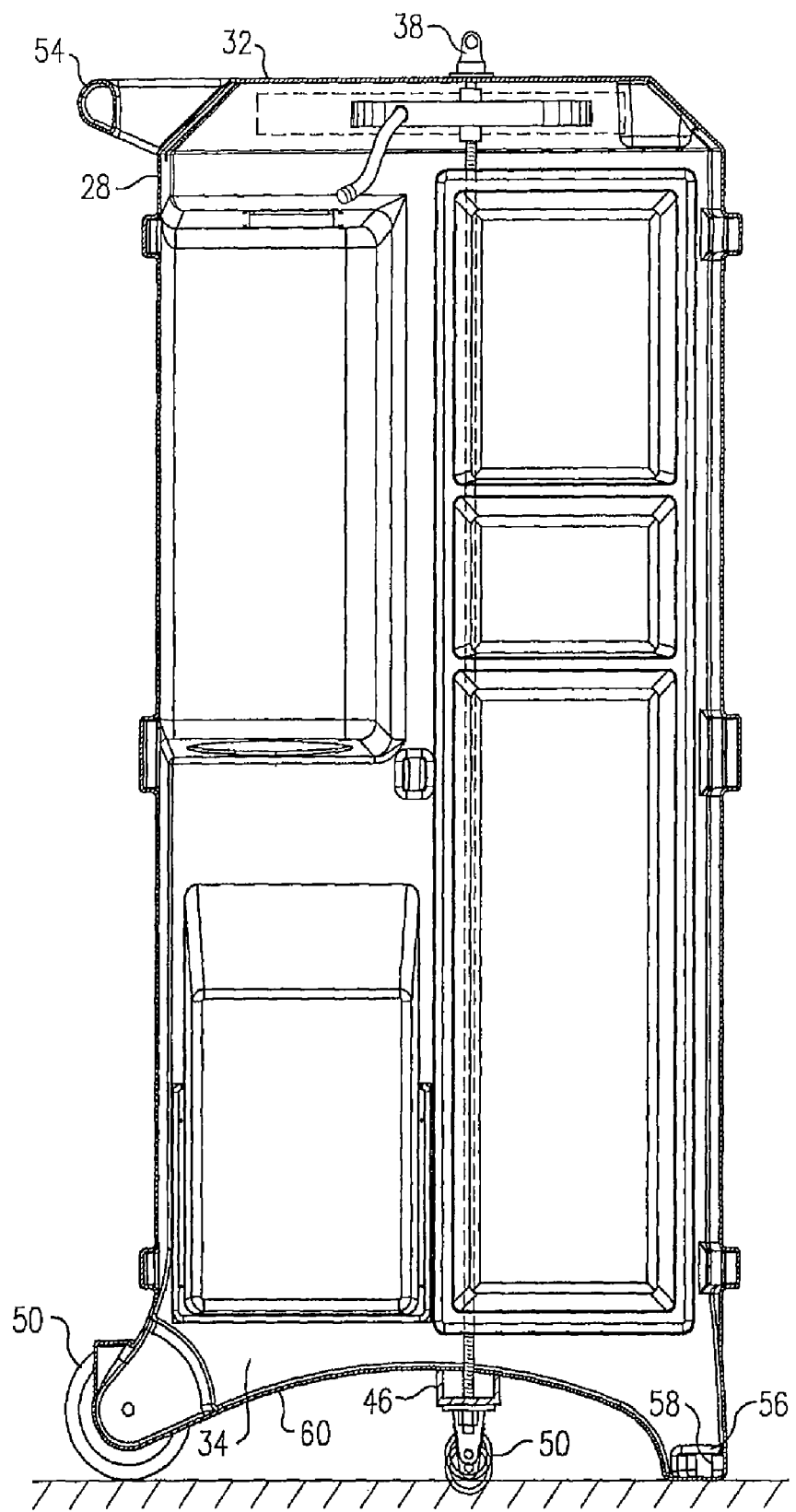
FIG. 6 is a cross sectional view taken along line 6-6 in FIG. 2.

Referring also to FIGS. 5 and 6, a lifting provision is preferably supplied at the top 32 of shell 22. The lifting provision preferably includes a suspension rod 40 extending through the top 32 and the base 34, a support member 46 disposed underneath the base 34 and engaging the rod 40, and an eyelet 42 engaging the rod at the top such that when the apparatus 20 is lifted by eyelet 42, weight of the apparatus 20 is supported by support member 46. Preferably internal vertical walls 36 allow for passage of suspension rod 40 between them and through the top 32 and base 34 of shell 22. Suspension rod 40 is preferably a threaded rod, and eyelet 42 engages its top end that extends beyond top 32 to provide the lifting provision for the apparatus. The lower end 44 of suspension rod 40 passes through base 34 and support member 46 which is secured against base 34 by tightening nut 48 on end 44 of suspension rod 40. Support member 46 is preferably a portion of metal structural channel, preferably aluminum, arranged so that the legs of the channel contact base 34. Eyelet 42 can be engaged by a hook on a cable attached to a crane, helicopter or other suspension device to allow apparatus 20 to be safely lifted and transported to the desired location. The lifting load is transmitted through suspension rod 40 to the base 34 so that the weight of apparatus 20 is supported by support member 46 which is approximately aligned with a substantial number of vertical walls 36. By using spreader bars on the lifting device, a plurality of apparatuses 20 can be ganged together and lifted simultaneously.

Figure 7:
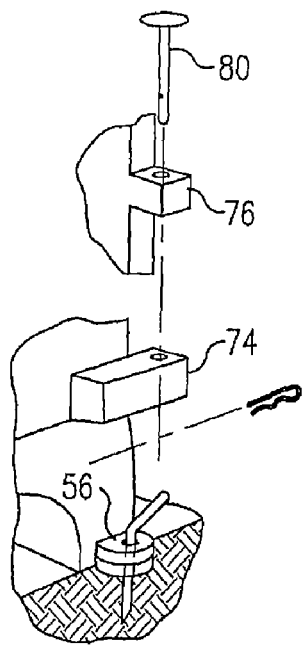
FIG. 7 is a detail view of a portion of FIG. 2 with a door hinge shown exploded and illustrating how the apparatus can be fastened to the ground.

Apparatus 20 has a pair of wheels 52 located at side 28 along base 34 and a handle 54 located along side 28 at top 32. To move apparatus 20, it may be tipped on wheels 52 by pulling handle 54, and the apparatus rolled such as like a wheelbarrow. At least one, and preferably a pair, of ground-engaging flanges 56 are located at side 24 along base 34. These flanges 56 act as anchor points and have apertures 58 which allow for securing flanges 56 to the ground or floor with devices such as bolts, stakes, or other tie-downs as illustrated in FIG. 7. The bottom of flanges 56 and bottom of wheels 52 generally contact a planar ground surface when the apparatus is standing vertically upright. To move apparatus 20 along a flat surface without tipping it, casters 50 may be disposed below base 34, and are preferably mounted on support member 46 in a spaced arrangement. Base 34 has a curved lower surface 60 which allows for positioning of support member 46 along lower surface 60 such that the casters are approximately centered under the shell and the bottom of casters 50 will contact the ground surface and slightly raise flanges 52 off the ground. Wheels 52 and flanges 56 are slightly elevated above the ground when the apparatus 20 is balanced on the casters 50, thereby facilitating moving the apparatus along the ground on the casters, the wheels 52 and flanges 56 occasionally bumping the ground as apparatus 20 is moved.

Referring again to FIG. 1, side 24 is substantially flat and has an upper portion 62 the outer surface of which is preferably used to display printed material 64. A transparent sheet 66 is removably installed over portion 62 and provides a weather resistant cover for material 64 displayed on portion 62.

The lower portion of side 24 may also be used to display information, but preferably it has a substantially flat table portion 68 pivotally attached to side 24 at hinge 70. Table portion 68 has a stowed position where it is secured against side 24. It also has a deployed position, illustrated by the phantom lines, whereat it is pivoted up away from side 24 and support members 72 are installed preferably between it and the bottom of side 24 so that table portion 68 is supported in a substantially horizontal position. Support members 72 may be separate elements, as illustrated, that are stowed under table portion 68, or in one of the internal compartments in apparatus 20. Alternatively, support members 72 may be one or more triangular shaped elements hingedly attached to side 24, similar to that shown in FIG. 8.

Figure 8:
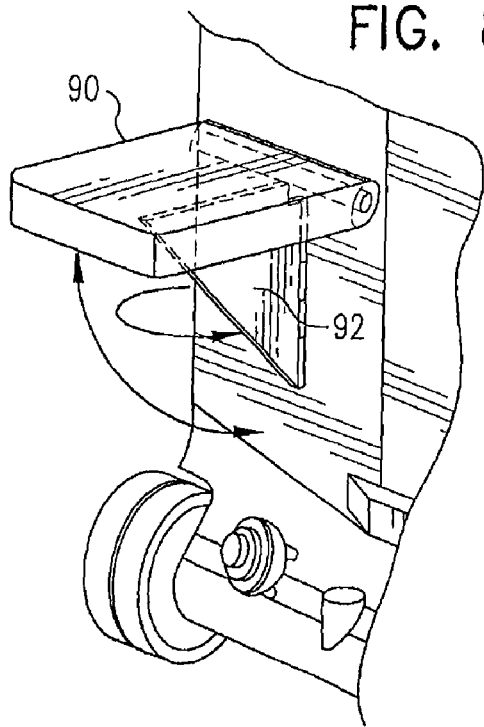
FIG. 8 is a detail view of a portion of FIG. 2 illustrating a seat.

Referring to FIGS. 2 and 8, side 28 has a seat 90 hingedly attached to it similar to table portion 68, but mounted lower on shell 22 to be at the proper height for sitting. Seat 90 may be approximately the full width of side 28 as illustrated in FIG. 2, or it may be only a partial width, such as illustrated in FIGS. 3 and 8. Seat 90 has a stowed position as shown in FIG. 1, and a deployed position as shown in FIG. 8. In the deployed position, seat 90 is supported by support member 92, which preferably is a triangular shaped element hingedly attached to the side 28. For the full width seat 90, two support elements 92 would preferably be used.

Referring to FIGS. 1-3 and 7, apparatus 20 has a plurality of full-length doors 68, 70, and 72 hingedly attached at corners of shell 22. The doors are arranged to close the compartments 94 when closed, and to provide access to a plurality of compartments when open. Shell 22 has lugs 74 at corners which cooperate with lugs 76 on the doors to form the hinges. Hinge pins 80 pass through apertures in lugs 74 and 76 to attach the doors to the shell 22. Hinge pins 80 are readily removable so that the doors can quickly and easily be removed.

Doors 68, 70 and 72 can have additional functions besides that of a door. Door 68 as illustrated has a window portion 76 which allows a user to quickly ascertain what is behind a door. This is very useful when apparatus 20 is to be used in a medical trauma situation and a variety of medical supplies are stored in compartments behind the door.

Figure 9:
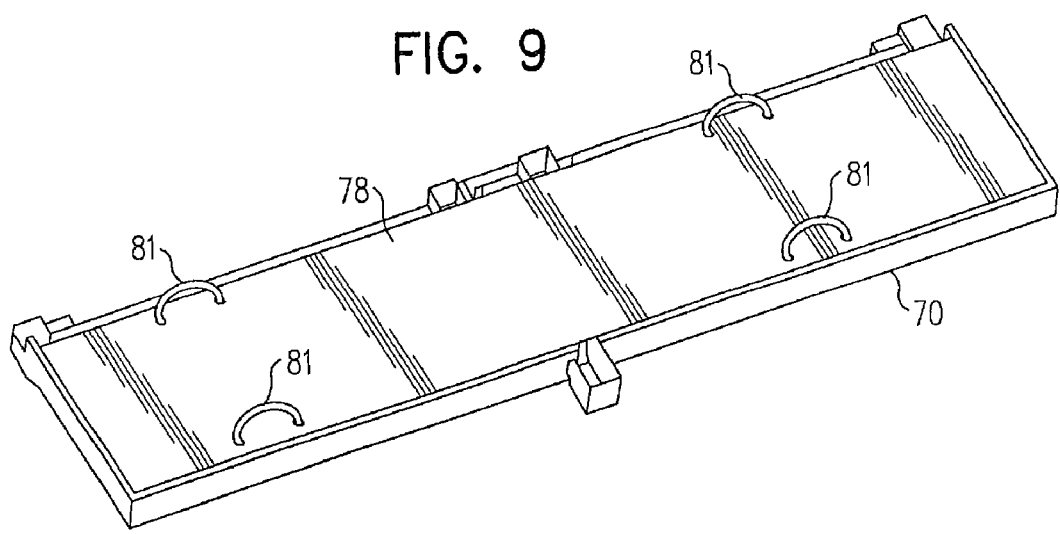
FIG. 9 is a perspective view of a door from the apparatus of FIG. 2 that can be used as a stretcher.

Referring to FIGS. 2, 3, and 9-12, when doors 70 and 72 are removed from shell 22 they have alternative uses, such as a stretcher and a table respectively. The doors are made of molded plastic and have a recessed portion which receives an insert, such as plywood, that provides additional function. Door 70, as shown in FIG. 9, functions as a stretcher. A stiffening insert 78, such as plywood, is fastened to door 70, and has handles 81, such as the four rope handles illustrated, to facilitate the door 70 being picked up by personnel to transport a sick or injured person. Door 70 with insert 78 is sufficiently stiff and strong to support a person on it. Alternatively, door 70 maybe formed so that it has sufficient stiffness as molded without needing a stiffening insert.

Figure 10:
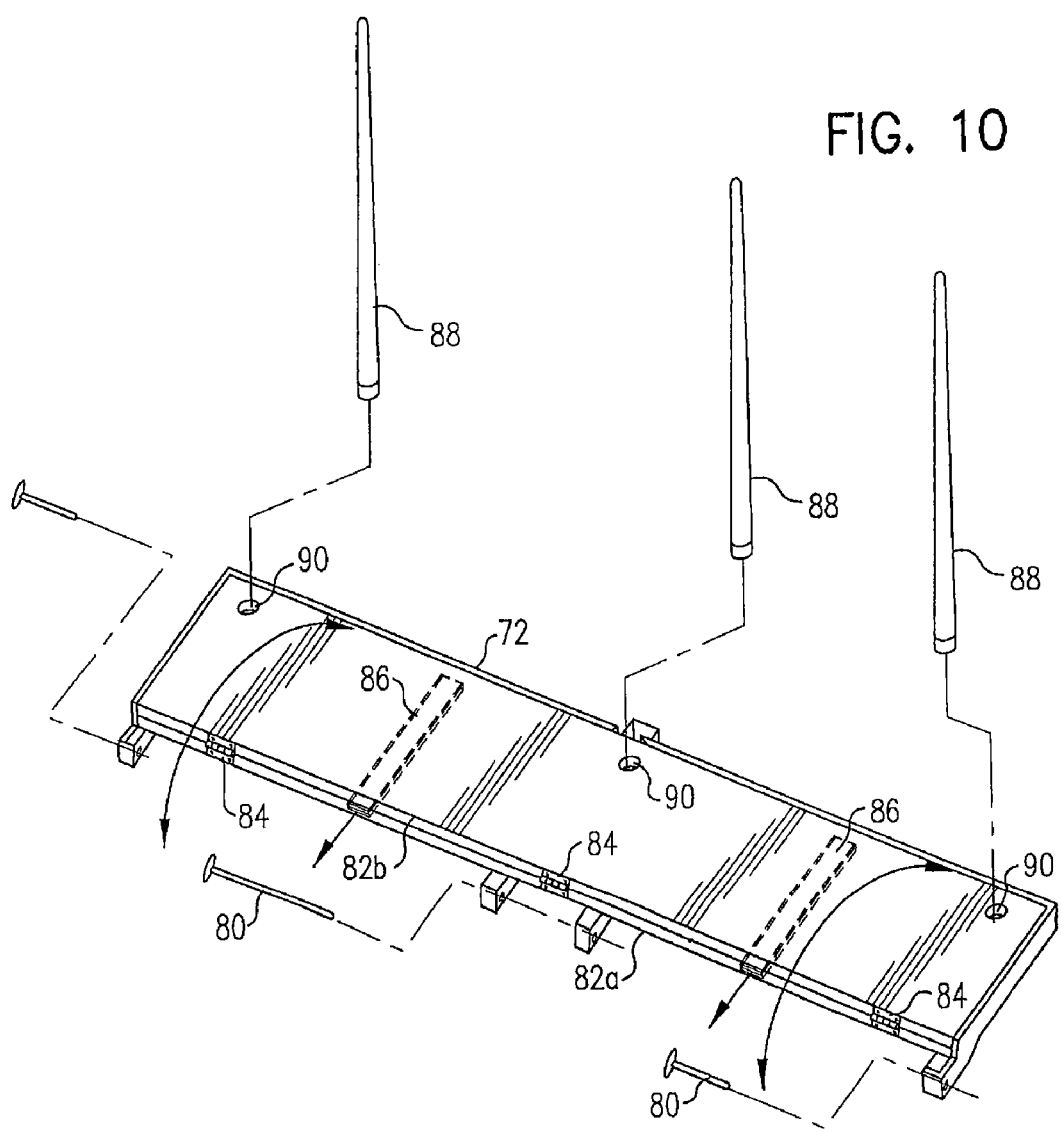
FIG. 10 is a perspective view of a door from the apparatus of FIG. 2 that can be used as a table.
Figure 11:
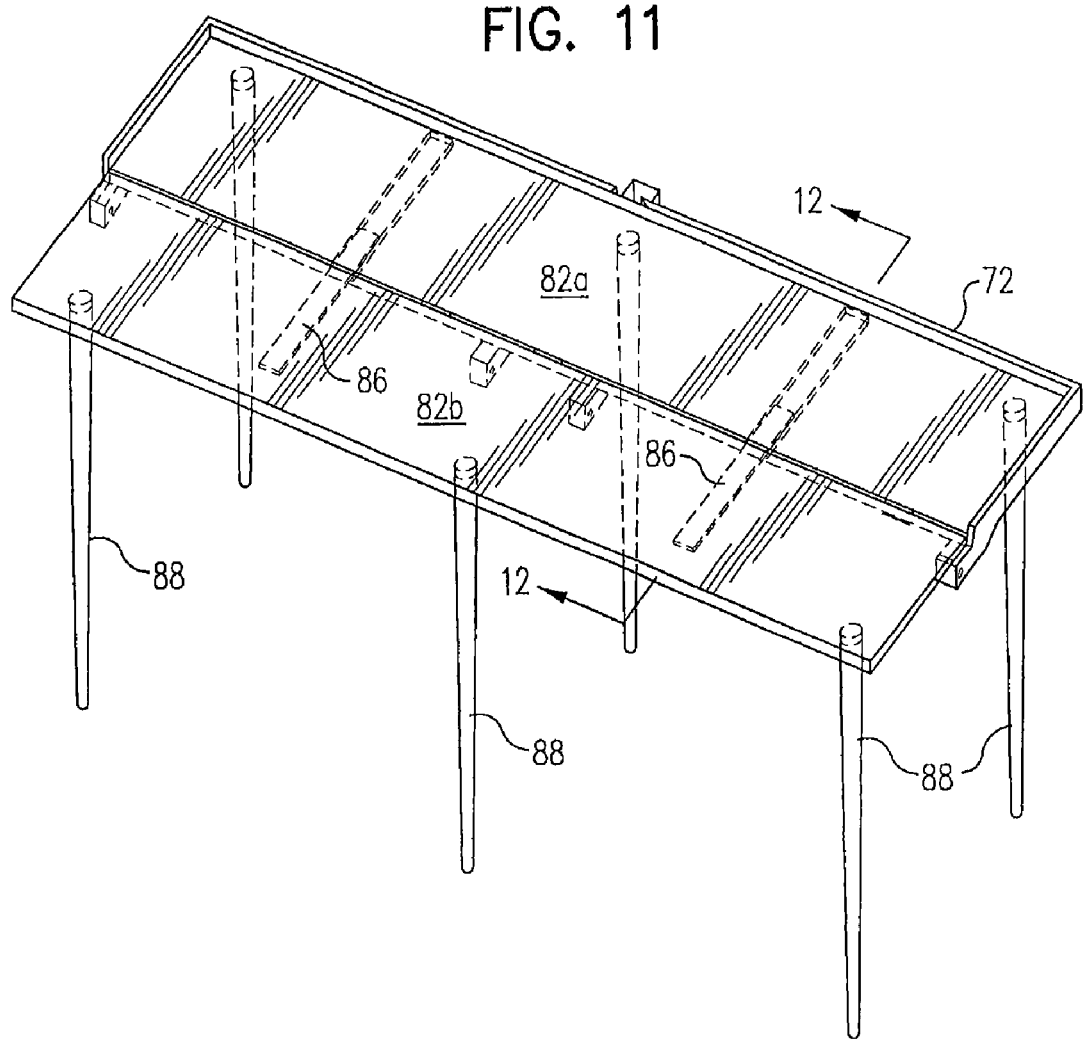
FIG. 11 is the view of FIG. 10 showing the insert in the door unfolded and legs attached to make the table.
Figure 12:
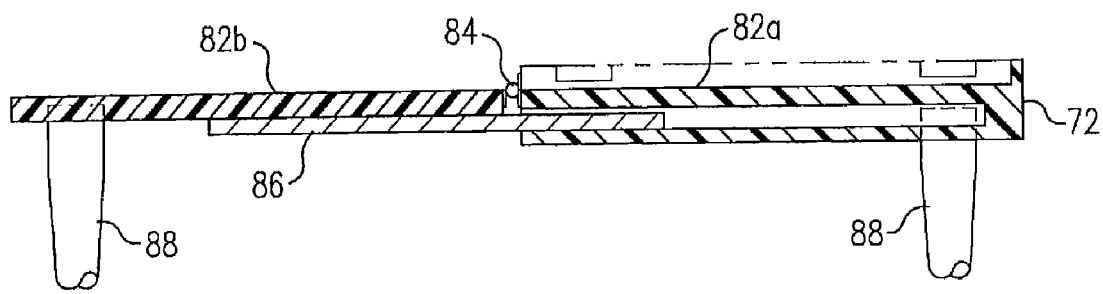
FIG. 12 is a cross sectional view taken along line 12-12 of FIG. 11.

Door 72, as illustrated has provisions for connecting support legs to it so that it may be used as a freestanding table when it is removed from shell 22. Door 72 preferably has a movable portion that that is deployed, preferably by pivoting or extending, to increase its area. As shown in FIGS. 10-12, door 72 preferably has a plywood insert 82 having a first portion 82a fastened to door 72 and a second portion 82b hingedly connected to first portion 82a, such as by individual hinges 84, or by a single long hinge. Slats 86 are stored in a cavity between first portion 82a and door 72. When portion 82b is opened, slats 86 are pulled partially out to support it as illustrated in FIGS. 11 and 12. Legs 88 are installed in apertures 90 partially through portions 82a and 82b to support the table in a generally horizontal position. Six legs may be used as illustrated, or the table may only have four legs, with one at each corner.

Referring again to FIG. 3, side 30 provides open access to a plurality of internal compartments with doors 70 and 72 closing in front of the compartments. Some typical arrangement and uses of compartments will be described in connection with the preferred embodiment illustrated, but compartments can be configured and used in many other ways.

Lower compartment 94a preferably holds water supply tank 96, wastewater storage tank 98, and eyewash wastewater tank 100. Lower compartment 94b adjacent compartment 94a would typically contain large heavy objects and is sufficiently large to hold two fire extinguishers 102 or oxygen bottles. Middle compartments 94c and 94d are designed for medium size and weight objects such as a portable first-aid kit 104, a portable defibrillator, blankets, or other bulky items, or for holding books, manuals or other important information such as material safety data sheets. A permanent first-aid kit 106 is mounted in upper compartment 94e, above which eyewash water supply tank 108 is stored in upper compartment 94f behind removable restraint 110. Upper compartment 92g may be divided into a plurality of smaller subcompartments separated by dividers 111. The subcompartments may be used for storing small lightweight items such as safety glasses, dust masks, earplugs, respirators and the like. The subcompartments may simply be open compartments as illustrated or they may include drawers or baskets to contain the objects.

Figure 13:
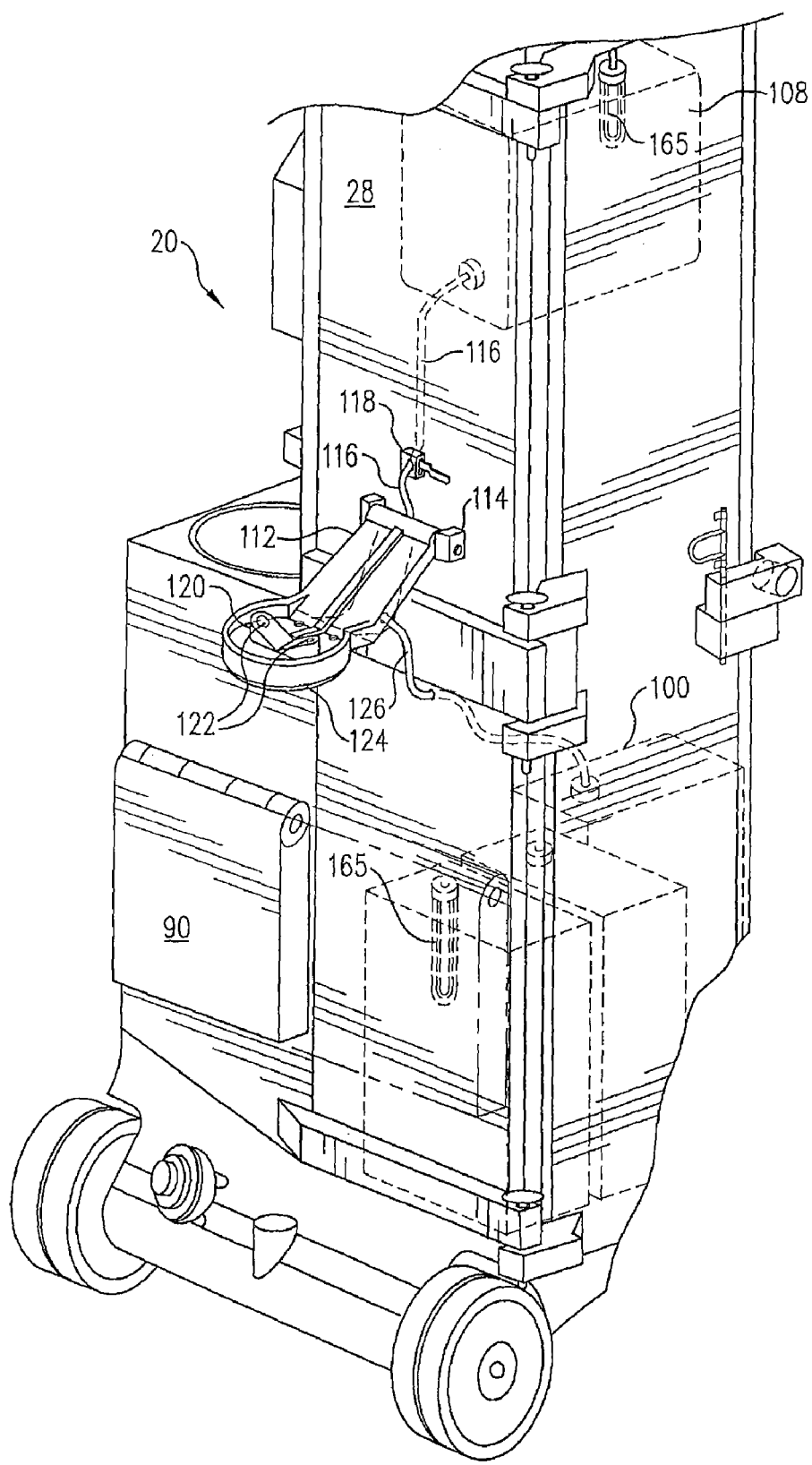
FIG. 13 is a detail view of a portion of the apparatus shown in FIG. 2 illustrating a stowable eye wash attached to the apparatus and its associated water system.

Referring to FIGS. 2 and 13, apparatus 20 preferably includes a stowable eyewash 112 pivotally attached to side 28 by bracket 114. Eyewash 112 has a stowed position, illustrated in FIG. 2, where it is pivoted up against side 28, and a deployed position extending outward from side 28 as shown in FIG. 13. It may be held in the stowed position by friction of pivot members cooperating with bracket 114, or by a catch, such as hook and loop fasteners, a snap, or latch. Water for the eyewash 112 is supplied by eyewash water supply tank 108 located above eyewash 112 through flexible supply tubing 116 and valve 118. With water supply tank 108 located approximately two feet higher than eyewash 112, gravity supplies sufficient water flow to operate eyewash 112. Flexible supply tubing 116 passes inside of eyewash 112 and connects to nozzle portion 120 which has apertures in depressed portions 122 through which water flows to wash eyes of a user. Eyewash 112 has a basin 124 which collects the used water and directs it through flexible drain tubing 126 to the eyewash wastewater tank 100. Eyewash water supply tank 108 may have a heating element 165, preferably electrical, installed in it to warm the water making it more comfortable to use.

Figure 14:
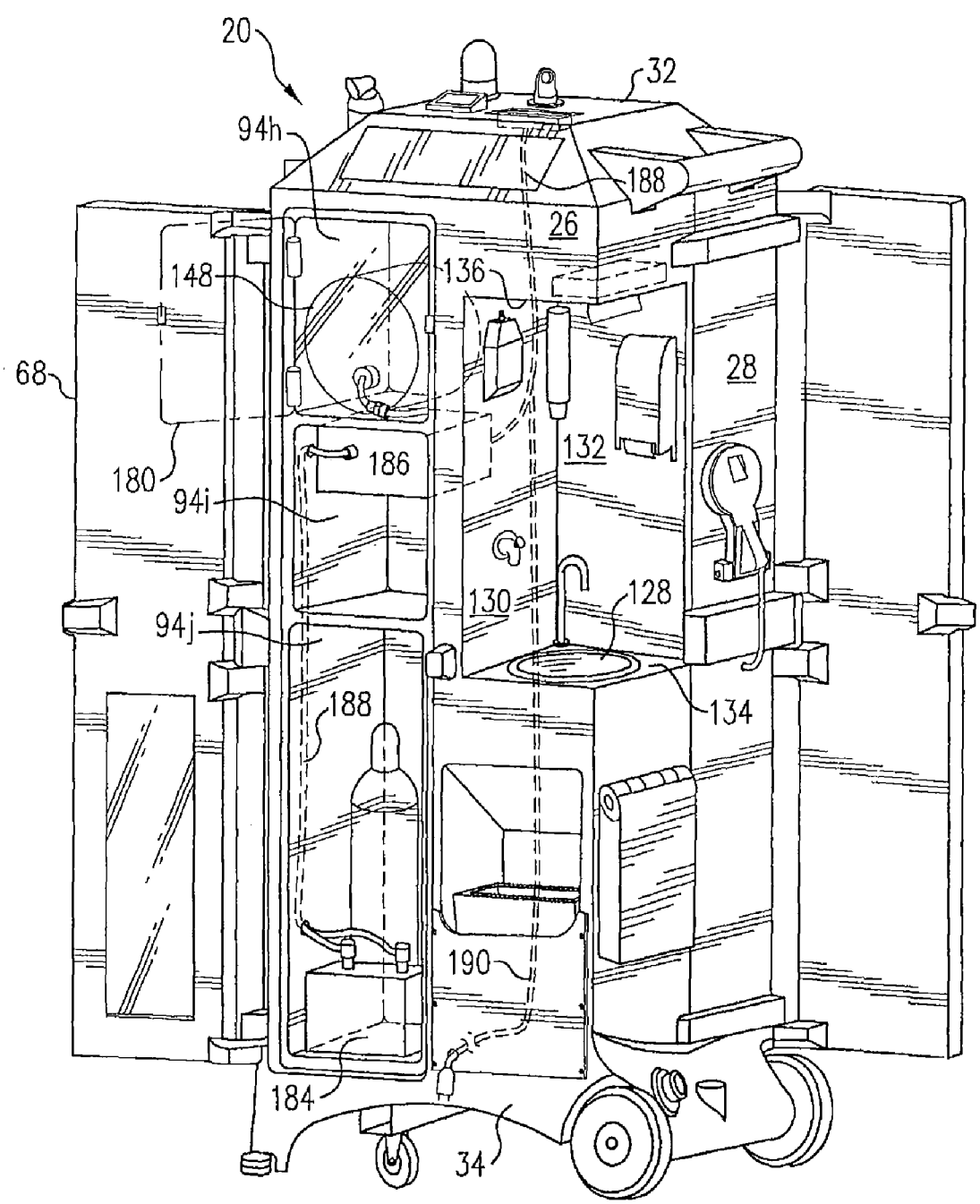
FIG. 14 is a perspective view of the apparatus of FIG. 1 from another angle between that of FIGS. 1 and 2 showing the sink area.
Figure 15:
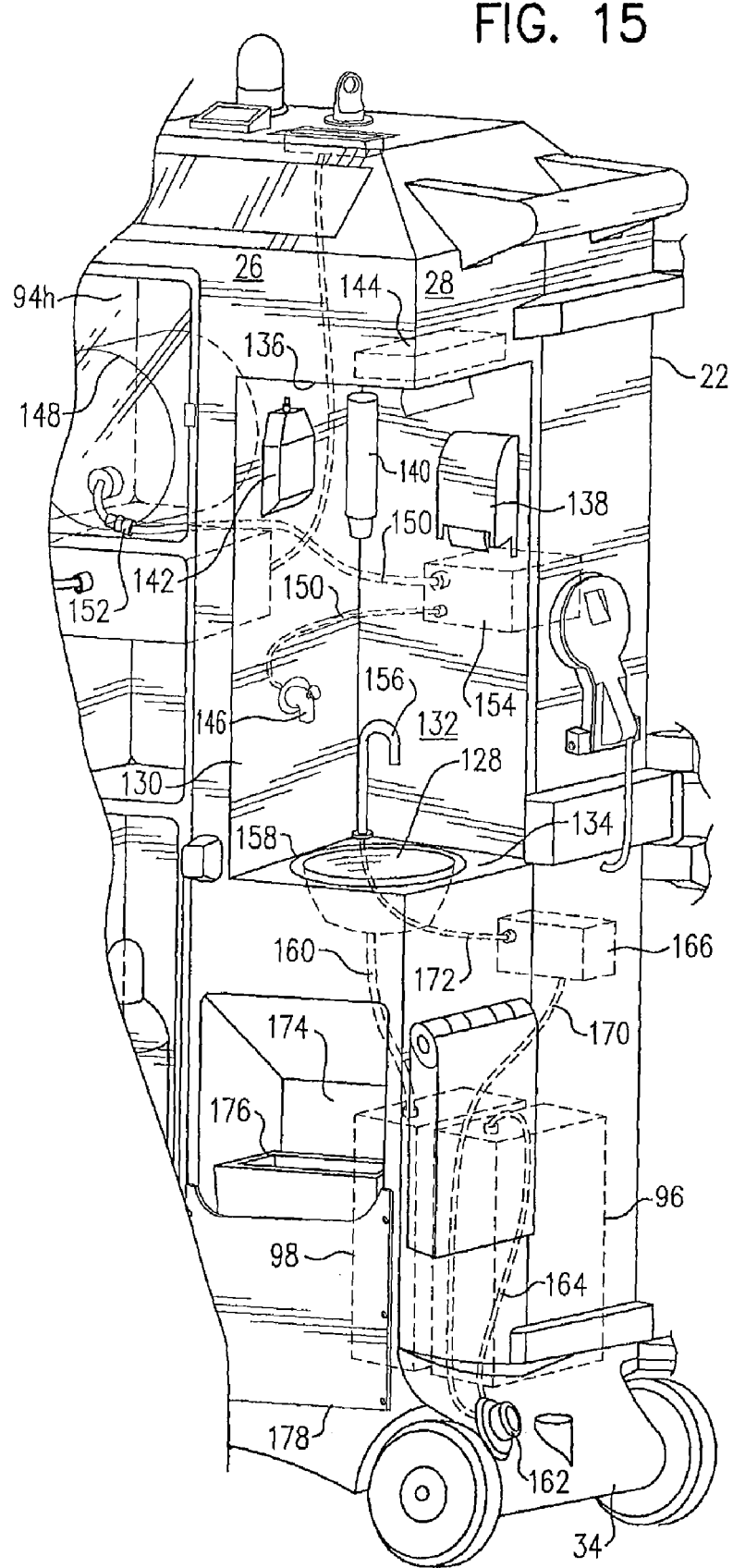
FIG. 15 is a detail view of a portion of FIG. 14 illustrating hand washing and drinking water systems.

Referring to FIGS. 14 and 15, the approximate upper half corner of shell 22 at the juncture of sides 26 and 28 has a first recessed area to accommodate a sink 128. The recessed area is bounded by wall 130 that extends inward from side 26, wall 132 that extends inward from side 28 to form a corner near the center of shell 22, ledge 134 at the bottom and ceiling 136 at the top. Walls 130 and 132 provide a mounting service for items such as soap dispenser 138, cup dispenser 140 and lens cleaner dispenser 142. Other items, such as napkin or tissue dispenser 144, may be mounted in ceiling 136. A drinking water spigot 146 is also preferably mounted on wall 130. A drinking water supply tank 148 is stored in upper compartment 94h adjacent wall 130 and higher than spigot 146 to allow for easy gravity feed of drinking water to spigot 146 through flexible drinking water tubing 150. A quick connect fitting 152 is preferably installed on tubing 150 near drinking water supply tank 148 to allow the supply tank 148 to be easily disconnected and removed for re-filling and also prevents water from leaking out of tubing 150 when the tank is disconnected. An optional refrigeration unit 154 may be included and connected to tubing 150 to chill drinking water before it exits spigot 146.

Referring to FIG. 15, sink 128 is mounted in ledge 134 along with wash water dispensing tube 156. Sink 128 is preferably a separate basin, as illustrated in FIGS. 16 and 17, installed in a cut-out in ledge 134. A lip 158 on sink 128 rests on ledge 134 and is secured to it by fasteners. Alternatively sink 128 may be integrally molded with ledge 134. Flexible drain tubing 160 is connected between a drain port 162 on sink 128 and wastewater storage tank 98.

Water for hand washing is supplied to water dispensing tube 156 from water supply tank 96. Since water supply tank 96 is below dispensing tube 156, a pump, such as foot pump 162 mounted in base 34, is used to pump the water through flexible water supply tubing 164. Water for hand washing is preferably warmed preferably by an electrical heating element 165 installed in water supply tank 96. Alternatively, a water heating device 166 may be connected to water supply tubing 164 between pump 162 and dispensing tube 156 so that water exiting tube 156 is warm. The heating device 166 receives water from the water supply system, heats it to produce heated water at a first temperature, then mixes it with unheated water from the water supply system to provide heated water at a second temperature lower than the first temperature. Referring also to FIG. 18, water heating device 166 may be a conventional under-sink water heater with an adjustable bypass valve 168, such as a needle valve, connected between cold water input line 170 and hot water output line 172. The amount of cold water flowing through bypass valve 168 instead of through water heater 166 is adjusted with valve 168 to set the temperature of water flowing through output line 172 to dispensing tube 156. The in-tank heat element is a simple way to heat water, but it requires heating the entire tank of water. Water heating device 166 heats a much smaller portion of water and may be more energy-efficient, though more complicated.

The shell 22 has a second recessed portion 174 at the lower portion of side 26 below sink 128 which preferably holds a waste collection container 176. A removable panel 178 partially covers recessed 174 to retain the waste collection container 176.

Referring again to FIG. 14, additional compartments 94i and 94j are located in side 26 left of sink 128 and are closed, along with compartment 94h, by door 68. Compartment 94h, which holds the drinking water supply tank 148, may have another closure panel 180 over it so that water supply tank 148 does not inadvertently fall out of compartment 94h when door 68 is opened. Closure panel 180 may be transparent and may be hingedly attached to side 26. Lower compartment 94j. may be further divided into sub compartments if desired, or it may be left large to hold large heavy objects, such as oxygen bottle 182 or fire extinguishers.

An electrical storage battery 184 is preferably stored at the bottom of compartment 94j and supplies D.C. backup power for the apparatus 20. A power supply and converter 186 is installed in one of the compartments, such as 94i, and has electrical wires 188 connected between it and battery 184 and various lights and communication devices in top 32. Power supply cord 190 also connects to power supply and converter 186 and extends out from apparatus 20 near base 34 to plug into 110 volt AC power. AC power is used for the water heater 166 and refrigeration unit 154 as well as supplying power to the power supply and converter 186.

Referring again to FIGS. 1 and 2, top 32 has electrical lights 192 for lighting the area around apparatus 20 and a warning light 194, such as a flashing or rotating warning beacon to attract attention. Top 32 also has a recessed compartment 196 above side 24 that holds air horn 198, which may easily be removed and used as necessary. Electronic communication equipment is also preferably locate in top 32. Such equipment may include a locating device 200 such as a global positioning satellite (GPS) receiving unit and a communication unit 202, such as for radio, telephone, or computer communication.

Referring again to FIG. 3, apparatus 20 has numerous compartments 94 that may contain an assortment of specialized goods allowing the contents of apparatus 20 to be customized meet specific needs.

For example, a disaster area survival/aid unit may contain items such as a string of 12 volt lights, blankets, tents, a stretcher, hard hats, clothes, large trash bags, a garden hose, buckets, picks, shovels, stoves, gas cans, barricade tape, name audit folders, and an emergency beacon.

A decontamination unit in may contain items such as a poly tarp, trash bags, hazardous waste bags, cable ties, duct tape, scissors, acid resistant gloves, solvent resistant gloves, glove liners, chemical boots, hazmat suits, chemical aprons, a garden hose, buckets, scrub brushes, sponges, a push broom, dust pan, safety goggles, an air pack, and folding chairs or stools.

A spill response unit may contain items such as, Absorball, acid neutralizer, spill pads/pillows/socks, acid resistant gloves, solvent resistant gloves, glove liners, chemical boots, hazmat suits, chemical aprons, SCBA 5-minute escape packs, "caution" and "do not enter" tape, scissors, yellow cones, an air pack, and folding chairs or stools.

A respiratory protection unit may contain items such as respirators, plastic bags, buckets, drain plugs, dust masks, eye protection, gas detector, mercury spill kit, acid neutralizer, base neutralizer, absorbent cloth, plastic sheeting, SCBA five minute escape packs shovels, spill pads/pillows/socks, sanitary wipes, and traffic cones.

A medical unit may contain items such as bio hazardous waste bags, towels, various blankets, bleach, blood and fluids cleanup kit, cervical collar, CPR masks, defibrillator, duct tape, emergency first-aid kit, hydrogen peroxide, exam gloves and liners, oxygen bottle, spill pads, splint kit, stretcher, tape, triage tags, SCBA five-minute escape packs.

This ability to customize each unit for specific needs, along with the incorporation of the other structures, devices and systems described above give the apparatus 20 the ability to comply with requirements imposed by both health and safety standards for various industrial applications, as well as to provide ready access to all the equipment and supplies needed for specific tasks, in a compact mobile unit.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims.

The invention claimed is:

1. A mobile safety compliance apparatus comprising:
 a shell having a base, a top, a plurality of substantially vertical walls between said base and said top, and a plurality of substantially horizontal walls connected to said vertical walls to form a plurality of compartments;
 at least one door hingedly linked to said shell, wherein said at least one door is selectively removable from said shell and includes a recessed portion and a plurality of handles disposed about a periphery thereof to enable said at least one door to be used as a stretcher when said at least one door is selectively removed from said shell; and
 a second door hingedly linked to said shell, wherein said second door is selectively removable from said shell and includes a movable portion hingedly attached to said second door to enable said second door to be used as a table and at least one extendable slat stored in said second door, said movable portion being deployable to increase the surface area of said second door when said second door is used as a table, said at least one extendable slat being configured to support said movable portion when said movable portion is deployed and said at least one extendable slat is extended.

2. The apparatus of claim 1, wherein the shell is made of plastic material and the vertical and horizontal walls are integrally molded as a single apparatus.

3. The apparatus of claim 1, wherein at least one of the plurality of compartments has removable dividers.

4. The apparatus of claim 1, wherein at least one of the at least one doors has a window portion.

5. The apparatus of claim 1, further comprising a pair of ground-engaging wheels attached to the shell at the base in spaced parallel arrangement to one side of the shell, the pair of wheels allowing the apparatus to be tipped onto the wheels to facilitate moving it.

6. The apparatus of claim 5, wherein the base of the shell includes at least one ground-engaging flange at a side of the base opposite the pair of ground engaging wheels, the flange having an aperture which allows for securing the flange to the ground.

7. The apparatus of claim 1, further comprising a spaced pair of ground engaging casters disposed below the base of the shell and approximately centered under the shell so that the apparatus is slightly elevated above the ground when it is balanced on the casters, thereby facilitating moving the apparatus along the ground on the casters.

8. The apparatus of claim 1, further comprising a lifting provision at the top of the shell for attaching a lifting device to lift the apparatus.

9. The apparatus of claim 8, wherein the lifting provision includes a suspension rod extending through the top and the base, a support member disposed underneath the base and engaging the rod, and an eyelet engaging the rod at the top such that when the apparatus is lifted by eyelet, weight of the apparatus is supported by the support member.

10. The apparatus of claim 1, wherein one of the vertical walls has an outer surface with a transparent sheet removably attached to a portion of it such that printed material can be displayed on the outer surface and the transparent sheet provides a weather resistant cover for the printed material.

11. The apparatus of claim 1, further comprising a substantially flat table portion pivotally attached to the shell such that the table portion has a stowed position against the shell and a deployed position whereat it is pivoted away from the shell to a substantially horizontal position.

12. The apparatus of claim 1, further comprising a seat portion pivotally attached to the shell such that the seat has a stowed position against the shell and a deployed position whereat it is pivoted away from the shell to a substantially horizontal position.

13. The apparatus of claim 1, wherein said second door further comprises a plurality of support legs to enable said second door to be used in a generally horizontal and elevated position.

14. The apparatus of claim 13, wherein said plurality of support legs are selectively removable.

15. The apparatus of claim 1, further comprising a water supply system including at least one supply tank removably stored in one of the compartments and apparatus connected to said water supply tank to dispense water contained therein;
 a waste water collection system including at least one waste water collection tank stored in one of the compartments and tubing connected to said water collection tank to convey waste water to it; and
 an eyewash attached to the shell, the eyewash receiving water from the water supply system, dispensing the water, collecting the water dispensed and directing it to the waste water collection system.

16. The apparatus of claim 15, wherein the eyewash is pivotable between a stowed position against the shell and a deployed position extending outward from the shell.

17. The apparatus of claim 15, wherein the eyewash is positioned lower than its source of water and water flows to the eyewash by force of gravity.

18. The apparatus of claim 15, further comprising a heating device to heat a portion of water contained in the water supply system.

19. The apparatus of claim 18, wherein the water supply system includes a washing supply tank that supplies water for hand washing, and the heating device is installed in the washing supply tank.

20. The apparatus of claim 18 wherein the heating device receives water from the water supply system, heats it to produce heated water at a first temperature, then mixes it with unheated water from the water supply system to provide heated water at a second temperature lower than the first temperature.

21. The apparatus of claim 15, wherein the water supply system includes a washing supply tank that supplies water for hand washing, the washing supply tank being lower than the sink, and further comprising a water dispensing tube located above the sink and a water pump disposed between the washing supply tank and the water dispensing tube, the water pump being in fluid communication with the washing supply tank to pump water from it when activated.

22. The apparatus of claim 21, wherein the water pump is mounted in the base of the shell.

23. The apparatus of claim 15, wherein the water supply system includes a drinking water supply tank and a drinking water spigot.

24. The apparatus of claim 23, wherein the drinking water supply tank is positioned higher than the drinking water spigot so that drinking water flows to the spigot by force of gravity.

25. The apparatus of claim 24, further comprising a refrigeration unit disposed between the drinking water supply tank and the drinking water spigot to chill drinking water.

26. The apparatus of claim 1, further comprising a soap dispenser, a cup dispenser, an eyeglass cleaner dispenser, and a tissue dispenser all attached to the first recess of the shell.

27. The apparatus of claim 1, wherein the shell has a second recess disposed below the first recess, the second recess containing a waste collection container.

28. The apparatus of claim 1, further comprising an electrical system including a power supply that can be connected to an external power source, and a storage battery for supplying temporary power to the electrical system.

29. The apparatus of claim 28, wherein the electrical system includes at least one light for lighting an area around the apparatus.

30. The apparatus of claim 28, wherein the electrical system includes a warning light to attract attention.

31. The apparatus of claim 28, further comprising electronic communications equipment mounted on the shell and connected to the electrical system.

32. The apparatus of claim 1, further comprising a first aid kit mounted to the shell in one of the compartments.

33. A mobile safety compliance apparatus comprising:
a shell having a base, a top and a plurality of substantially vertical walls, said walls having formed therebetween one or more compartments;
a first door hingedly linked to said shell, wherein said first door is configured to close at least a first compartment of said one or more compartments when said first door is closed, and provide access to said first compartment when said first door is opened, wherein said first door is selectively removable from said shell and includes a plurality of handles disposed about a periphery thereof and a recessed portion receiving an insert therein to enable said first door to be used as a stretcher when said first door is selectively removed from said shell;
a second door hingedly linked to said shell, wherein said second door is configured to close at least a second compartment of said one or more compartments when said second door is closed, and provide access to said second compartment when said second door is opened, wherein said second door is selectively removable from said shell and include a movable portion hingedly attached to said second door to enable said second door to be used as a table and at least one extendable slat stored in said second door, said movable portion being deployable to increase the surface area of said second door when said second door is used as a table, said at least one extendable slat being configured to support said movable portion when said movable portion is deployed and said at least one extendable slat is extended;
ground-engaging wheels attached to said shell at said base;
a lifting provision at said top of said shell for attaching a lifting device to lift the apparatus;
a water supply system including at least one water supply tank in at least one of said one or more compartments and apparatus connected to said water supply tank to dispense water contained therein;
a waste water collection system including at least one waste water collection tank in at least one of said one or more compartments and tubing connected to said water collection tank to convey waste water to it;
a sink positioned in a recess defined in at least one of said substantially vertical walls of the shell, said sink being in fluid communication with said tubing of said waste water collection system to convey water collected by said sink into said waste water system;
a heating device to heat a portion of water in said water supply system;
electric lights attached to said shell for lighting an area around said shell; and
an eyewash attached to said shell, said eyewash receiving water from said water supply system, dispensing the water, collecting the water dispensed and directing it to said waste water collection system.

34. A mobile safety compliance apparatus containing equipment and emergency, the mobile safety compliance apparatus comprising:
a housing with a plurality of compartments formed therein, said plurality of compartments preconfigured to hold the equipment and emergency supplies in anticipation of an emergency;
electronic communication equipment stored in said housing, said electronic communication equipment selected from a group consisting of a global positioning satellite receiving unit, a radio, a telephone and computer communication devices;
at least one door configured to be selectively attached to said housing for selectively closing and providing access to at least one of said plurality of compartments, wherein said at least one door is selectively removable from said housing and includes a plurality of handles disposed about a periphery thereof, and a recessed portion to enable said at least one door to be used as a stretcher when said at least one door is selectively removed from said housing;
a second door hingedly linked to said shell, wherein said second door is selectively removable from said shell and includes a movable portion hingedly attached to said second door to enable said second door to be used as a table and at least one extendable slat stored in said second door, said movable portion being deployable to increase the surface area of said second door when said second door is used as a table, said at least one extendable slat being configured to support said movable portion when said movable portion is deployed and said at least one extendable slat is extended; and
a water supply system comprising:
a drinking water supply tank storing potable water disposed in a compartment near the top of said housing, and a drinking water spigot in fluid communication with the drinking water supply tank, the drinking water spigot being disposed in said housing below the drinking water supply tank such that water flows from the drinking water supply tank to the drinking water spigot by force of gravity; and a washing supply tank storing water for washing hands, and a washing water dispensing tube in fluid communication with the washing water supply tank such that the washing water can be dispensed through the washing water dispensing tube.

35. The mobile safety compliance apparatus recited in claim 34, wherein the water supply system further comprises a heating unit for heating the water from the washing supply tank, and a refrigeration unit for cooling the drinking water from the drinking water supply tank.

* * * * *